May 3, 1966  J. J. MARAFIOTI  3,249,408
FLUX FREE BONDED ARTICLE
Original Filed Jan. 4, 1962
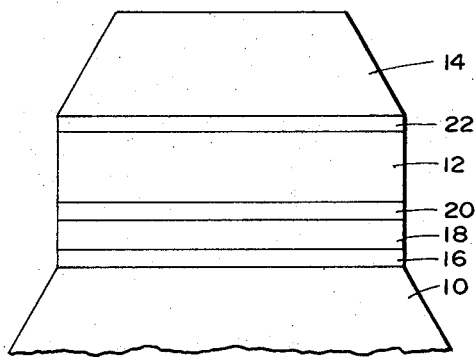
INVENTOR.
James J. Marafioti
BY Walter S. Zebrowski
ATTORNEY

3,249,408
FLUX FREE BONDED ARTICLE

James J. Marafioti, Bradford, Pa., assignor to Corning Glass Works, Corning, N.Y., a corporation of New York
Original application Jan. 4, 1962, Ser. No. 163,996. Divided and this application May 24, 1965, Ser. No. 457,994
4 Claims. (Cl. 29—195)

This application is a division of application Serial No. 163,996, filed January 4, 1962.

The present invention relates to the production of assemblies embodying flux free solder bonds and more particularly to the bonding of quartz or ceramic crystals to glass delay lines but is in no way limited to such applications.

In the past, various flux free bonding methods have been employed. One such method is described in U.S. Patent No. 2,964,839 issued to J. J. Marafioti and H. A. Sheetz and assigned to the assignee of the instant invention. It has been found, however, that heretofore known methods, although suitable for fused silica and the like delay line materials, are not suitable for glasses which are deleteriously affected by high heat metal filming processes employed in prior art methods. Examples of glasses which are deleteriously affected by high heat are alkali-lead-silicate glass, borosilicate glass and the like. Reference is made to pending application Serial No. 117,851 by H. L. Hoover and assigned to the assignee of the instant application wherein deleterious effects of high temperatures and rapid temperature changes on alkali-lead-silicate glasses is described in detail.

It is the specific object of this invention to provide an improved method of bonding quartz or ceramic crystals to delay lines.

It is another object of this invention to provide a method for producing flux free solder bonds where the mating surfaces need not be premetallized with high melting temperature alloys or metals.

It is a further object to provide a method of bonding similar or different solid materials without the need for high temperature intermediate metal filming.

Additional objects, features and advantages of the present invention will become apparent, to those skilled in the art, from the following detailed description and the attached drawing, on which, by way of example, only the preferred embodiment of this invention is illustrated.

I have found that such objects can be achieved by wetting the mating surfaces with metal, disposing a nugget of low melting temperature bonding alloy between the wetted surfaces and thereafter bonding the mating surfaces under the influence of pressure and the comparatively low temperature required for melting said bonding alloy.

The drawing is an elevation of a delay line illustrating a crystal bonded to a delay medium and an electrode therefor.

The particular delay line shown comprises a delay medium 10, of alkali-lead-silicate glass, to which is bonded a quartz crystal transducer 12, which in turn has bonded thereto a back electrode 14. The back electrode 14 can suitably be formed of tin-lead or indium-tin-lead alloys. The bonding materials between the delay medium 10 and the quartz transducer 12 comprise a film of indium 16, a layer of indium-tin-lead bonding alloy 18, and another film of indium 20.

Preparatory to making the bond between the glass and the quartz, the mating surfaces thereof are cleaned, by any suitable commercial cleaning method such as washing with detergent and water, and dried, and the glass mating surface is thereafter wetted with indium. This wetting is accomplished by heating an ultrasonic soldering iron to a temperature of about 180° C., applying indium to its soldering surface and then rubbing said soldering surface on the mating surface of the glass. The ultrasonic soldering iron causes a cavitation of the molten indium releasing any entrapped air and dirt, as well as breaking up any oxidation which would inhibit wetting of the mating surface. The indium is built up into a small puddle by the addition of indium nuggets, which puddle is thereafter allowed to solidify. Since the quartz crystal is usually thin and fragile, said ultrasonic method of wetting its mating surface is undesirable. Furthermore, wetting of the quartz crystal is preferably accomplished just prior to forming the bond so that the wetting indium does not solidify prematurely causing undesirable stresses within the crystal. It should be noted, however, that if a body is being bonded which is not fragile, its mating surface may be wetted at the same time and in the same manner as that described for the glass mating surface.

The bond between the glass and the quartz is formed as follows. The delay medium 10, having its mating surface suitably wetted, is placed in a suitable press. A nugget of bonding alloy, consisting of, for example, 98% indium, 1% tin and 1% lead, is placed on the wetted mating surface and the delay medium is heated to a temperature of about 180° C. When said bonding material has melted and formed a puddle, the surface skin thereof is removed by wiping with optical lens paper or by dragging a taut strand of silica fiber over the puddle. Concurrently with the heating of the delay medium and the melting of the bonding material, the quartz crystal transducer 12, is placed in a chuck, and held by vacuum while it is similarly heated. The crystal mating surface is then wetted, by swabbing or the like with molten indium, and a puddle is built up by adding nuggets of indium. When the indium puddle on the quartz crystal has been formed its surface skin is removed in the same manner as described for the bonding alloy.

While maintaining the temperature at about 180° C., a simultaneous skin removing operation of the respective puddles is carried out, the quartz crystal transducer 12 is immediately placed on the bonding alloy puddle and the chuck is removed. The crystal 12 is then suitably positioned and the two parts are subjected to gradually increasing pressure between the press heads, which are heated to a temperature of about 180° C., until the desired bonding pressure is reached. After the desired pressure is reached, the temperature of the press heads is reduced, to reduce the bond temperature to 135° C., during a period of approximately 10 minutes. When the press head temperature reaches 135° C., cooling thereof is discontinued and the heat input adjusted to obtain a stabilized bond temperature of 135° C. At such temperature the indium and bonding alloy solidify, completing the glass to quartz bond so that the assembly may be removed from between the press heads.

The back electrode 14, composed of a tin-lead or indium-tin-lead alloy, is then joined to the other mating surface of quartz crystal transducer 12, as follows. The quartz mating surface is wetted with a second bonding alloy having a melting temperature of less than about 130° C. consisting of, for example, 58% indium, 41% tin, and 1% lead, and a puddle thereof is formed in a manner similar to that described heretofore, except that a lower temperature of about 135° C. is employed. Concurrently with the formation of said puddle on the quartz, the back electrode 14, is preheated to about 130° C. and is also wetted by swabbing with said second bonding alloy. A puddle is not built up on the back electrode because the tin-lead or indium-tin-lead alloy of which it is composed, dissolves readily into the molten second bonding alloy.

Simultaneous removal of the surface skin of both said puddle and the wetted electrode surface are effected and immediately followed by mating of the surfaces. After the back electrode 14 has been placed on the quartz crystal, it is allowed to stabilize in temperature briefly, after which the electrode is shifted to its final desired position with respect to the quartz and the excess of molten material is brushed away from the electrode. The second bonding alloy forms bonding layer 22. Application of heat is now discontinued and the completed assembly is permitted to gradually cool to room temperature.

If desired, the back electrode may be formed on the quartz crystal by first wetting the crystal surface and forming a puddle as hereinabove described, then adding nuggets of said second bonding alloy to the puddle, allowing them to melt, and thereafter when a height of about ⅛″ is reached allowing the molten material to solidify.

It should be noted that a ceramic or quartz crystal may be premetallized by any prior art methods and thereafter bonded to glass or the like by the method of this invention.

Although the flux free bonds in the foregoing described structure are between alkali-lead-silicate glass and a quartz crystal and between a quartz crystal and a tin-lead or indium-tin-lead alloy, it is clearly evident that flux free bonding of other glasses, quartz, fused silica, ceramics, metals and the like can be readily achieved.

Although the present invention has been described with respect to specific details of certain embodiments thereof, it is not intended that such details be limitations upon the scope of the invention except insofar as set forth in the following claims.

I claim:
1. An article of manufacture comprising a first body of alkali-lead-silicate glass and a second body formed of material selected from the group consisting of quartz and ceramic, and a bond between said bodies comprising a layer of indium adjacent the mating surfaces of each of said bodies and a layer between the indium layers of an alloy consisting essentially of indium, tin and lead each in effective amounts to promote bonding.

2. A delay line comprising a delay medium of alkali-lead-silicate glass and a crystal transducer, and a bond between said transducer and a delay medium comprising a layer of indium adjacent each said transducer and delay medium and a layer between the indium layers of an alloy consisting essentially of indium, tin, and lead each in effective amounts to promote bonding.

3. The delay line of claim 2 wherein the crystal transducer is formed of material selected from the group of quartz and ceramic.

4. The delay line of claim 2 wherein the alloy is indium based.

References Cited by the Examiner
UNITED STATES PATENTS

| | | | |
|---|---|---|---|
| 2,746,140 | 5/1956 | Belser | 29—195 |
| 2,964,839 | 12/1960 | Marafiotic et al. | 29—195 |
| 3,184,303 | 5/1965 | Grobin | 29—195 |

DAVID L. RECK, *Primary Examiner.*